(12) United States Patent
Lee

(10) Patent No.: US 11,099,988 B2
(45) Date of Patent: Aug. 24, 2021

(54) MEMORY SYSTEM AND OPERATING METHOD THEREOF

(71) Applicant: SK hynix Inc., Gyeonggi-do (KR)

(72) Inventor: Joo-Young Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 102 days.

(21) Appl. No.: 16/248,370

(22) Filed: Jan. 15, 2019

(65) Prior Publication Data

US 2020/0026649 A1  Jan. 23, 2020

(30) Foreign Application Priority Data

Jul. 23, 2018 (KR) ........................ 10-2018-0085585

(51) Int. Cl.
*G06F 12/16* (2006.01)
*G06F 12/0806* (2016.01)

(52) U.S. Cl.
CPC .. *G06F 12/0806* (2013.01); *G06F 2212/1044* (2013.01); *G06F 2212/608* (2013.01)

(58) Field of Classification Search
CPC combination set(s) only.
See application file for complete search history.

(56) References Cited

U.S. PATENT DOCUMENTS

2005/0050382 A1\* 3/2005 Beeston .............. G06F 12/0223
714/6.12

FOREIGN PATENT DOCUMENTS

| KR | 1020110094289 | 8/2011 |
| KR | 1020150044654 | 4/2015 |
| KR | 10-2019-0090614 | 8/2019 |
| KR | 10-2019-0120573 | 10/2019 |
| KR | 10-2019-0128284 | 11/2019 |

\* cited by examiner

*Primary Examiner* — Yong J Choe
(74) *Attorney, Agent, or Firm* — IP & T Group LLP

(57) ABSTRACT

A memory system includes: a memory device including a first memory buffer and a second memory buffer; a controller write buffer; a memory buffer manager suitable for controlling the memory device to buffer first data stored in the first memory buffer into the second memory buffer while the memory device programs, in a program operation, the first data into a memory block; a controller buffer manager suitable for deleting the first data stored in the controller write buffer after the memory device buffers the first data into the second memory buffer; and a failure processor suitable for controlling the memory device to perform a reprogram operation of reprogramming the first data, when the program operation fails.

18 Claims, 12 Drawing Sheets

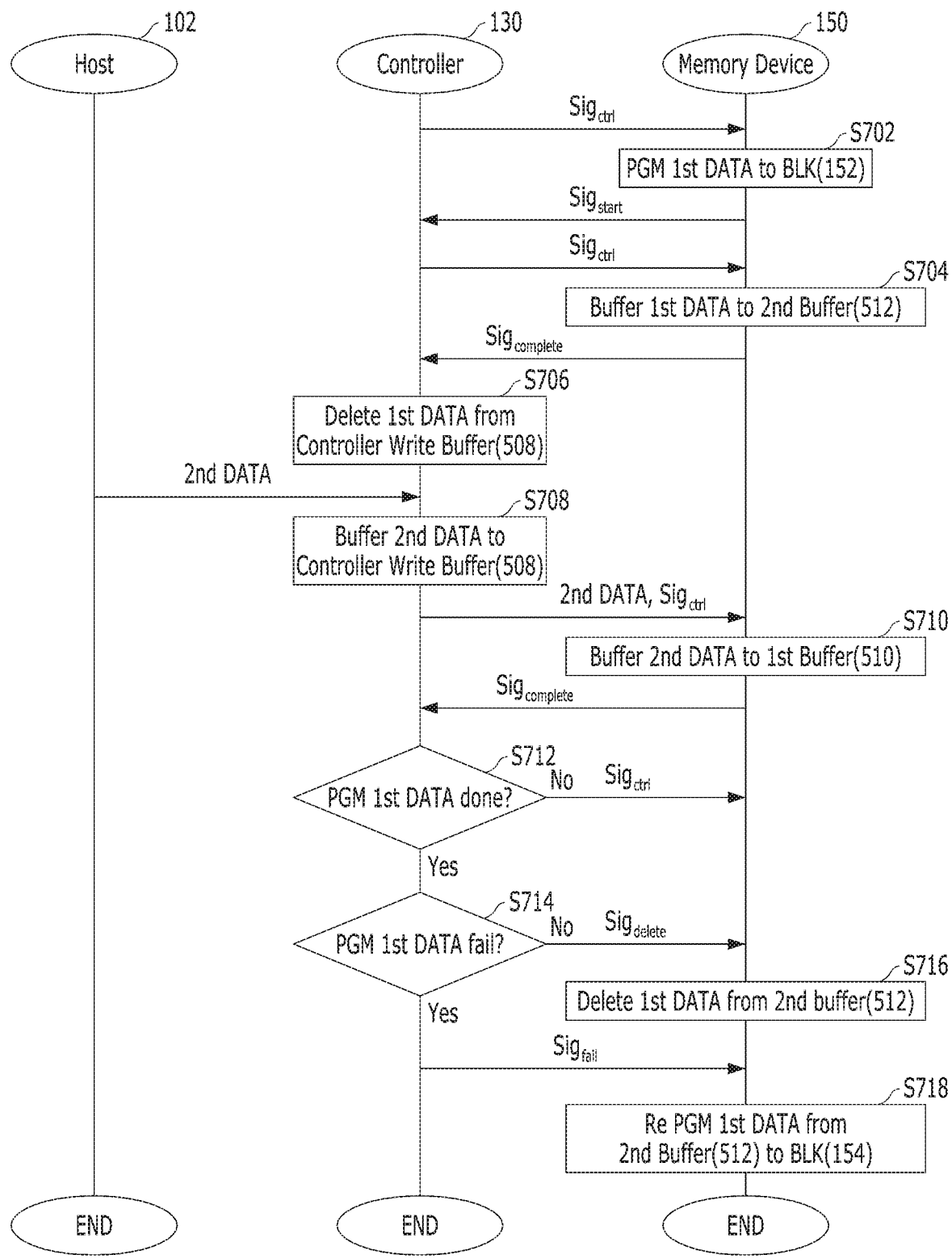

MEMORY SYSTEM AND OPERATING METHOD THEREOF

CROSS-REFERENCE TO RELATED APPLICATION

The present application claims priority of Korean Patent Application No. 10-2018-0085585, filed on Jul. 23, 2018, which is incorporated herein by reference in its entirety.

BACKGROUND

1. Field

Various embodiments of the present invention generally relate to a memory system. Particularly, the embodiments relate to a memory system that efficiently performs a cache program operation, and a method for operating the memory system.

2. Description of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Such memory systems provide excellent stability, durability, high information access speed, and low power consumption since they have no moving parts, as compared with the characteristics of a hard disk device. Examples of memory systems having such advantages include universal serial bus (USB) memory devices, memory cards having various interfaces, and solid state drives (SSD).

SUMMARY

Embodiments of the present invention are directed to a memory system that may efficiently perform a cache program operation.

In accordance with an embodiment of the present invention, a memory system includes: a memory device including a first memory buffer and a second memory buffer; a controller write buffer; a memory buffer manager suitable for controlling the memory device to buffer first data stored in the first memory buffer into the second memory buffer while the memory device programs, in a program operation, the first data into a memory block; a controller buffer manager suitable for deleting the first data stored in the controller write buffer after the memory device buffers the first data into the second memory buffer; and a failure processor suitable for controlling the memory device to perform a reprogram operation of reprogramming the first data, when the program operation fails.

In accordance with another embodiment of the present invention, a method for operating a memory system includes: controlling a memory device to buffer first data stored in a first memory buffer into a second memory buffer while the memory device programs, in a program operation, the first data into a memory block; deleting the first data stored in a controller write buffer after the memory device buffers the first data into the second memory buffer; and controlling the memory device to perform a reprogram operation of reprogramming the first data, when the program operation fails.

BRIEF DESCRIPTION OF THE DRAWINGS

FIG. 7 is a flowchart describing an operation of a memory system in accordance with an embodiment of the present invention.

DETAILED DESCRIPTION

Figure 1:
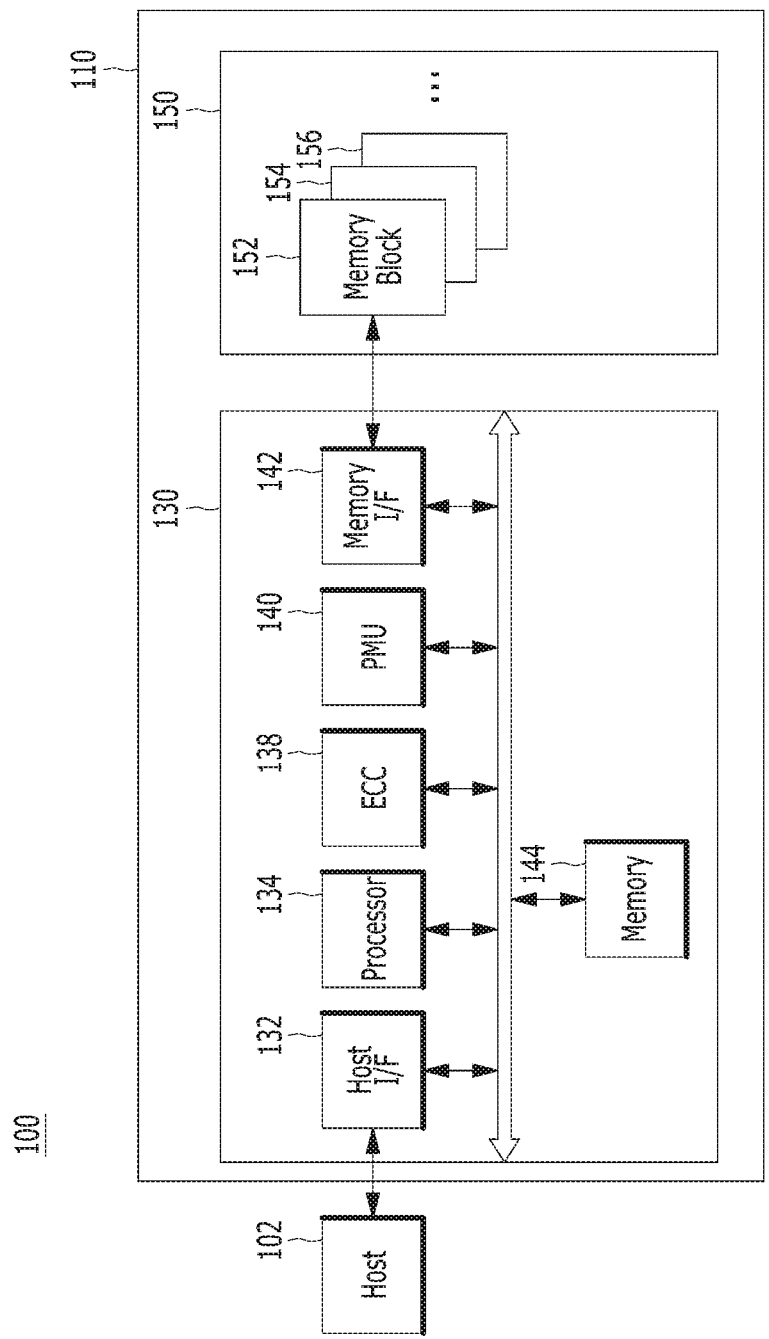
FIG. 1 is a block diagram illustrating a data processing system including a memory system in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention. Also, throughout the specification, reference to "an embodiment," "another embodiment" or the like is not necessarily to only one embodiment, and different references to any such phrase are not necessarily to the same embodiment(s).

It will be understood that, although the terms "first", "second", "third", and the like may be used herein to identify various elements, these elements are not limited by these terms. These terms are used to distinguish one element from another element that otherwise have the same or similar names. Thus, a first element described below in one instance could be termed a second or third element in another instance without departing from the spirit and scope of the present invention.

The drawings are not necessarily to scale and, in some instances, proportions may have been exaggerated to clearly illustrate features of the embodiments. When an element is referred to as being connected or coupled to another element, it should be understood that the former can be directly connected or coupled to the latter, or electrically connected or coupled to the latter via one or more intervening elements.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless the context indicates otherwise.

The terminology used herein is for describing particular embodiments and is not intended to limit the present invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and not be interpreted in an idealized or overly formal sense unless expressly so defined herein.

In the following description, numerous specific details are set forth to provide a thorough understanding of the present invention. The present invention may be practiced without some or all of these specific details. In other instances, well-known process structures and/or processes have not been described in detail to not unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of a variety of portable electronic devices such as a mobile phone, a MP3 player and a laptop computer, or any of a variety of non-portable electronic devices such as a desktop computer, a game machine, a TV and a projector.

The host 102 may include at least one OS (operating system) or a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request. The OS may manage and control overall functions and operations of the host 102. The OS may support an operation between the host 102 and a user using the data processing system 100 or the memory system 110.

The memory system 110 may perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a PCMCIA (personal computer memory card international association) card, SD card including a mini-SD, a micro-SD and a SDHC, and an UFS device. The memory system 110 may be configured as a part of a computer, a smart phone, a portable game player, or one of various components configuring a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

The structure of the memory device 150 and the 3D stack structure of the memory device 150 will be described in detail below with reference to FIGS. 2 to 4.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

More specifically, the controller 130 may include a host interface (I/F) 132, a processor 134, an error correction code (ECC) component 138, a Power Manager (PMU) 140, a memory interface 142, and a memory 144, all operatively coupled or engaged via an internal bus.

The host interface 132 may process a command and data of the host 102. The host interface 132 may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE). The host interface 132 may be driven via a firmware, that is, a host interface layer (HIL) for exchanging data with the host 102.

Further, the ECC component 138 may correct error bits of data to be processed by the memory device 150 and may include an ECC encoder and an ECC decoder. The ECC encoder may perform an error correction encoding on data to be programmed into the memory device 150 to generate data to which a parity bit is added. The data including the parity bit may be stored in the memory device 150. The ECC decoder may detect and correct an error contained in the data read from the memory device 150. The ECC component 138 may perform error correction through a coded modulation such as a Low Density Parity Check (LDPC) code, a Bose-Chaudhri-Hocquenghem (BCH) code, a turbo code, a Reed-Solomon code, a convolution code, a Recursive Systematic Code (RSC), a Trellis-Coded Modulation (TCM) and a Block coded modulation (BCM). However, the ECC component 138 is not limited to these error correction techniques. As such, the ECC component 138 may include any and all circuits, modules, systems or devices for performing suitable error correction.

The PMU 140 may manage electrical power used and provided in the controller 130.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In another embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data required to perform data write and read operations between the host 102 and the memory device 150 and other data required for the controller 130 and the memory device 150 to perform these operations.

The processor 134 may control overall operations of the memory system 110. The processor 134 may use firmware to control the overall operations of the memory system 110. The firmware may be referred to as flash translation layer (FTL). The processor 134 may be implemented with a microprocessor or a central processing unit (CPU).

For example, the controller 130 may perform an operation requested by the host 102 in the memory device 150 through the processor 134, which is implemented as a microprocessor, a CPU, or the like. Also, the controller 130 may perform a background operation on the memory device 150 through the processor 134, which may be realized as a microprocessor or a CPU. The background operation performed on the memory device 150 may include an operation of copying and processing data stored in some memory blocks among the memory blocks 152 to 156 of the memory device 150 into other memory blocks, e.g., a garbage collection (GC) operation, an operation of performing swapping between the memory blocks 152 to 156 or between the data of the memory blocks 152 to 156, e.g., a wear-leveling (WL) operation, an operation of storing the map data stored in the controller 130 in the memory blocks 152 to 156, e.g., a map flush operation, or an operation of managing bad blocks of the memory device 150, e.g., a bad block management operation of detecting and processing bad blocks among the memory blocks 152 to 156 in the memory device 150.

The memory device of the memory system in accordance with an embodiment of the present invention is described in detail with reference to FIGS. 2 to 4.

Figure 2:
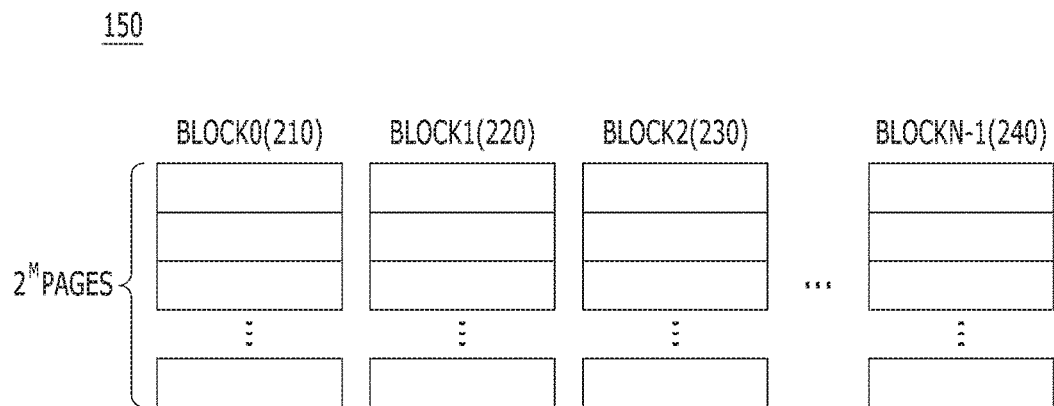
FIG. 2 is a schematic diagram illustrating an exemplary configuration of a memory device employed in a memory system, such as that shown in FIG. 1.

FIG. 2 is a schematic diagram illustrating the memory device 150. FIG. 3 is a circuit diagram illustrating an exemplary configuration of a memory cell array of a memory block 330 in the memory device 150. Memory block 330 may be representative of any of memory blocks 152, 154, 156. FIG. 4 is a schematic diagram illustrating an exemplary 3D structure of the memory device 150.

Referring to FIG. 2, the memory device 150 may include a plurality of memory blocks BLOCK0 to BLOCKN−1, where N is an integer greater than 1. Each of the blocks BLOCK0 to BLOCKN−1 may include a plurality of pages, for example, $2^M$ or M pages, the number of which may vary according to circuit design, M being an integer greater than 1. Each of the pages may include a plurality of memory cells that are coupled to a plurality of word lines WL.

Also, memory cells in the memory blocks BLOCK0 to BLOCKN−1 may be one or more of a single level cell (SLC) memory block storing 1-bit data or a multi-level cell (MLC) memory block storing 2-bit data. Hence, the memory device 150 may include SLC memory blocks or MLC memory blocks, depending on the number of bits which can be expressed or stored in each of the memory cells in the memory blocks. The SLC memory blocks may include a plurality of pages which are embodied by memory cells, each storing one-bit data. The SLC memory blocks may generally have higher data computing performance and higher durability than the MCL memory blocks. The MLC memory blocks may include a plurality of pages which are embodied by memory cells each storing multi-bit data (for example, 2 or more bits). The MLC memory blocks may generally have larger data storage space, that is, higher integration density, than the SLC memory blocks. In another embodiment, the memory device 150 may include a plurality of triple level cell (TLC) memory blocks. In yet another embodiment, the memory device 150 may include a plurality of quadruple level cell (QLC) memory blocks. The TCL memory blocks may include a plurality of pages which are embodied by memory cells each capable of storing 3-bit data. The QLC memory blocks may include a plurality of pages which are embodied by memory cells each capable of storing 4-bit data.

Instead of a nonvolatile memory, the memory device 150 may be implemented by any one of a phase change random access memory (PCRAM), a resistive random access memory (RRAM(ReRAM)), a ferroelectrics random access memory (FRAM), and a spin transfer torque magnetic random access memory (STT-RAM(STT-M RAM)).

The memory blocks 210, 220, 230, 240 may store the data transferred from the host 102 through a program operation, and may transfer data stored therein to the host 102 through a read operation.

Figure 3:
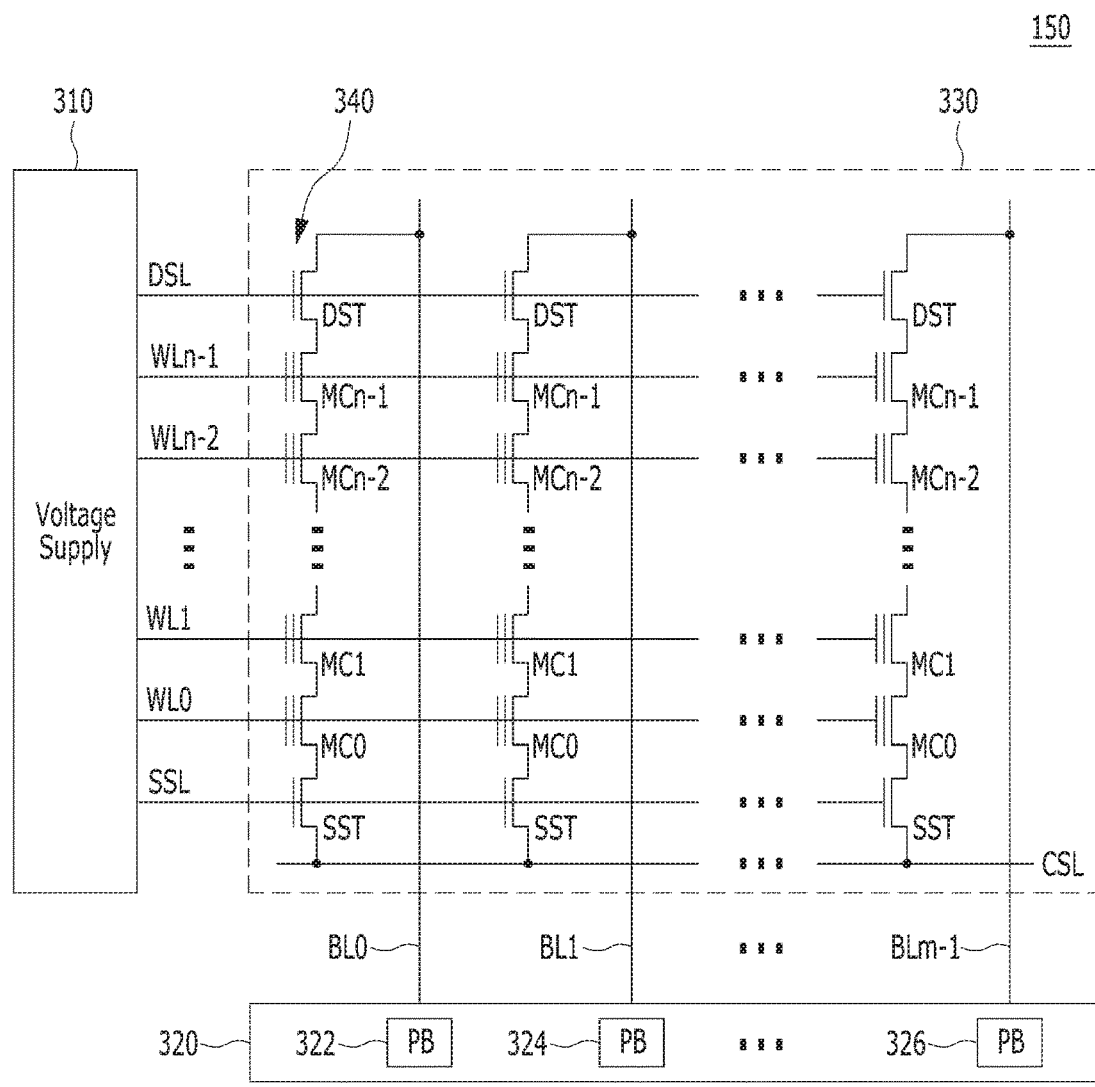
FIG. 3 is a circuit diagram illustrating an exemplary configuration of a memory cell array of a memory block in a memory device, such as that shown in FIG. 1.
Figure 4:
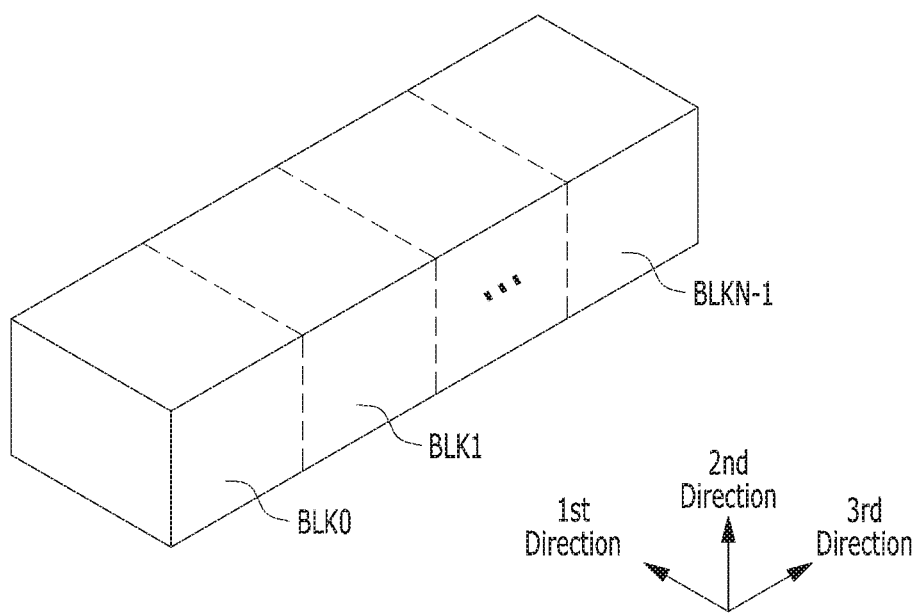
FIG. 4 is a block diagram illustrating a structure of a memory device of a memory system in accordance with an embodiment of the present invention.

Referring to FIG. 3, the memory block 330 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the present disclosure is not limited thereto. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which generates different word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select at least one of the memory blocks (or sectors) of the memory cell array, select at least one of the word lines of the selected memory block, and provide the word line voltages to the selected word line(s) and the unselected word lines as may be needed.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

The memory device 150 may be embodied by a 2D or 3D memory device. Particularly, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1. As shown in FIG. 4, each of the memory blocks 152, 154 and 156 may be realized in a 3D structure (or vertical structure). For example, the memory blocks 152, 154 and 156 may be a three-dimensional structure extending in first to third directions, e.g., an x-axis direction, a y-axis direction, and a z-axis direction.

Each memory block 330 in the memory device 150 may include a plurality of NAND strings NS that extend in the second direction, and a plurality of NAND strings NS that extend in the first direction and the third direction. Each of the NAND strings NS may be coupled to a bit line BL, at least one string selection line SSL, at least one ground selection line GSL, a plurality of word lines WL, at least one dummy word line DWL, and a common source line CSL, and each of the NAND strings NS may include a plurality of transistor structures TS.

In short, each memory block 330 may be coupled to a plurality of bit lines BL, a plurality of string selection lines SSL, a plurality of ground selection lines GSL, a plurality of word lines WL, a plurality of dummy word lines DWL, and a plurality of common source lines CSL. Each memory block 330 may include a plurality of NAND strings NS. Also, in each memory block 330, one bit line BL may be coupled to a plurality of NAND strings NS to realize a plurality of transistors in one NAND string NS. Also, a string selection transistor SST of each NAND string NS may be coupled to a corresponding bit line BL, and a ground selection transistor GST of each NAND string NS may be coupled to a common source line CSL. Herein, memory cells MC may be provided between the string selection transistor SST and the ground selection transistor GST of each NAND string NS. In other words, a plurality of memory cells may be realized in each memory block 330 of the memory device 150.

A cache program operation may buffer second data which is buffered in a write buffer in the controller 130 into a first memory buffer in the memory device 150 through a pipelining scheme, while the memory device 150 is programming first data in a memory block. The pipelining scheme may perform a plurality of operations in parallel to shorten the time it takes to perform an operation or sequence of operations that otherwise would take a long time. When a program operation is performed according to the cache program operation, the memory device 150 may program the second data from the first memory buffer into the memory block immediately after the program operation for the first data is completed. Therefore, it is possible to improve the performance of sequentially programming a large amount of data in a sequential program operation.

According to the prior art, when an operation of programming the first data into the memory block is completed when the cache program operation is performed, the controller decides whether or not the first data is failed data, i.e., whether or not the program operation failed, and then the first data stored in the controller write buffer may be deleted. Since the capacity of the controller write buffer is limited, the controller according to the prior art buffers the second data provided from the host into the controller write buffer after the first data is deleted from the controller write buffer.

According to the prior art, when the first data programmed in the memory block turns out to be failed data, the controller reprograms the first data into the memory block after buffering the first data stored in the controller write buffer into the first memory buffer. Therefore, the time of buffering the first data from the controller write buffer into the first memory buffer is included in the failure processing operation, thereby increasing the overall time to perform such operation.

In contrast, the controller 130 according to an embodiment of the present invention improves the speed of the cache program operation. In particular, the controller 130 may buffer the second data provided from the host 102 into the controller write buffer before the program operation for the first data is completed, and delete the first data stored in the controller write buffer after buffering the first data stored in the first memory buffer into the second memory buffer, while programming the first data into the memory block.

When the first data programmed in the memory block is a failed data, i.e., when the program operation failed, the controller 130 according to an embodiment of the present invention may quickly perform a reprogram operation when a program failure occurs by reprogramming the first data stored in the second memory buffer into the memory block.

Figure 5:
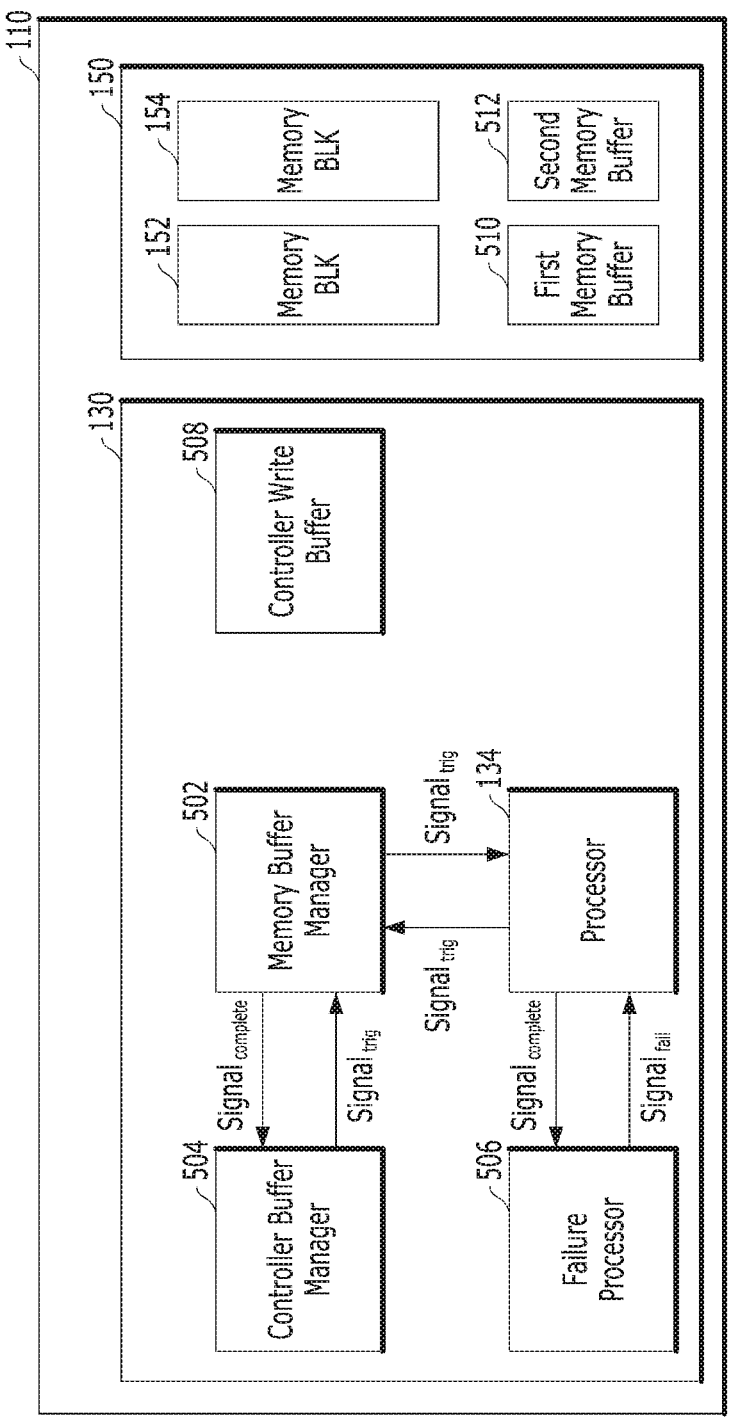
FIG. 5 is a block diagram illustrating a structure of a memory system in accordance with an embodiment of the present invention.

FIG. 5 illustrates a memory system 110 in accordance with an embodiment of the present invention. FIG. 5 shows constituent elements related to the present invention in the data processing system 100 of FIG. 1.

As described above, the memory system 110 may include a memory device 150 and a controller 130. The controller 130 may store host data provided from the host 102 in the memory blocks included in the memory device 150, and control a program operation and a buffering operation of the memory device 150.

Referring to FIG. 5, the controller 130 may further include a memory buffer manager 502, a controller buffer manager 504, a failure processor 506, and a controller write buffer 508. The memory device 150 may further include a first memory buffer 510 and a second memory buffer 512. According to an embodiment of the present invention, the controller write buffer 508 is a volatile memory, and the first memory buffer 510 and the second memory buffer 512 may be nonvolatile memories.

The processor 134 may control the memory device 150 to program the first data stored in the first memory buffer 510 into the memory block 152. The processor 134 may transfer a trigger signal ($Signal_{trig}$) to the memory buffer manager 502 at the time that the memory device 150 programs the first data in the memory block 150.

The memory buffer manager 502 may control the memory device 150 to buffer the first data stored in the first memory buffer 510 into the second memory buffer 512 based on the trigger signal provided. When the operation of buffering the first data into the second memory buffer 512 is completed, the memory buffer manager 502 may transfer a complete signal ($Signal_{complete}$) to the controller buffer manager 504.

The controller buffer manager 504 may delete the first data stored in the controller write buffer 508 based on the complete signal provided. The controller buffer manager 504 may buffer the second data provided from the host 102 into the controller write buffer 508 after deleting the first data stored in the controller write buffer 508. When the operation of buffering the second data into the controller write buffer 508 is completed, the controller buffer manager 504 may transfer the trigger signal to the memory buffer manager 502.

The memory buffer manager 502 may provide the memory device 150 with the second data stored in the controller write buffer 508 based on the provided trigger signal $Signal_{trig}$. The memory buffer manager 502 may control the memory device 150 to buffer the provided second data into the first memory buffer 510. When the memory device 150 completes the operation of buffering the second data into the first memory buffer 510, the memory buffer manager 502 may transfer the trigger signal to the processor 134.

When the memory device 150 completes the operation of programming the first data into the memory block 150, the processor 134 may transfer the complete signal to the failure processor 506. When the memory device 150 does not complete the operation of programming the first data into the memory block 150, the processor 134 may continue to control the memory device 150 to program the first data into the memory block 152.

The failure processor 506 may decide whether the first data programmed in the memory block 152 is a failure or not based on the provided complete signal. When the first data programmed in the memory block 152 fails, the fail processor 506 may transfer a failure signal ($Signal_{fail}$) to the processor 134. When the first data is successfully programmed, the failure processor 506 may delete the first data stored in the second memory buffer 512.

The processor 134 may perform a reprogram operation onto the first data, which was not successfully programmed in the program operation, based on the provided failure signal. According to one embodiment of the present invention, the processor 134 may control the memory device 150 to reprogram the first data stored in the second memory buffer 512 into the new memory block 154. According to another embodiment of the present invention, the processor 134 may control the memory device 150 to transfer the first data stored in the second memory buffer 512 to the controller 130 and then to be reprogrammed with the first data.

Figure 6:
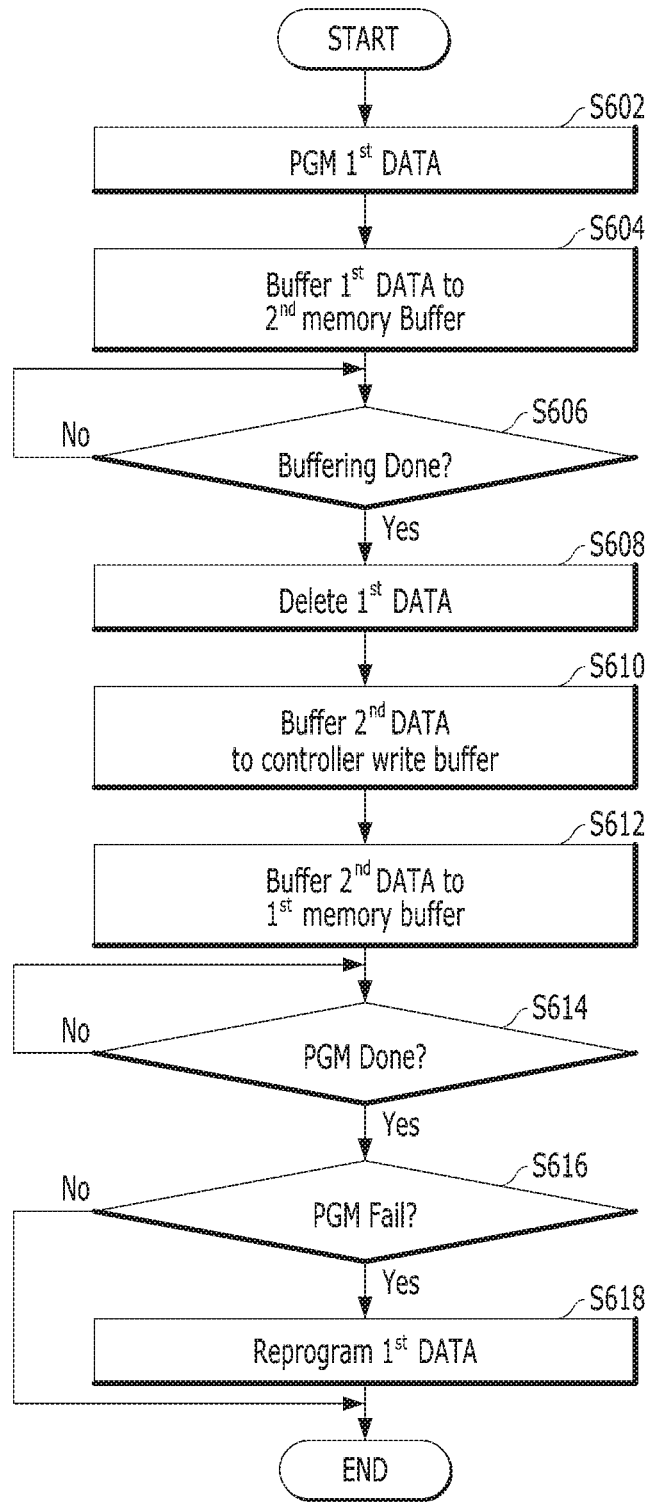
FIG. 6 is flowchart describing operation of a memory system in accordance with an embodiment of the present invention.

FIG. 6 is a flowchart describing an operation of the memory system 110 in accordance with an embodiment of the present invention.

In step S602, the processor 134 may control the memory device 150 to program the first data stored in the first memory buffer 510 into the memory block 152. The processor 134 may transfer the trigger signal to the memory buffer manager 502 at the time that the memory device 150 programs the first data into the memory block 152.

In step S604, the memory buffer manager 502 may control the memory device 150 to buffer the first data stored in the first memory buffer 510 into the second memory buffer 512 based on the trigger signal provided in step S602.

In step S606, the memory buffer manager 502 may decide whether the memory device 150 has completed the operation of buffering the first data into the second memory buffer 512. If it is decided that the memory device 150 has completed this buffering operation ('Y' in the step S606), the memory buffer manager 502 may transfer the complete signal to the controller buffer manager 504. When it is decided that the memory device 150 did not complete the operation of buffering the first data into the second memory buffer 512 ('N' in the step S606), the memory buffer manager 502 may continue to monitor the status of the buffering operation until it is completed.

In step S608, the controller buffer manager 504 may delete the first data stored in the controller write buffer 508 based on the complete signal provided in step S604.

In step S610, the controller buffer manager 504 may buffer the second data provided from the host 102 into the controller write buffer 508. When the operation of buffering the second data into the controller write buffer 508 is completed, the controller buffer manager 504 may transfer the trigger signal to the memory buffer manager 502.

In step S612, the memory buffer manager 502 may provide the memory device 150 with the second data stored in the controller write buffer 508 based on the trigger signal provided in step S610. The memory buffer manager 502 may control the memory device 150 to buffer the second data into the first memory buffer 510. When the operation of buffering the second data into the first memory buffer 510 is completed, the memory buffer manager 502 may transfer the trigger signal to the processor 134.

In step S614, the processor 134 may decide whether the memory device 150 has completed the operation of programming the first data into the memory block 150 in the step S602 or not. When it is decided that the memory device 150 has completed this buffering operation ('Y' in the step S614), the processor 134 may transfer the complete signal to the failure processor 506. When it is decided that the memory device 150 did not complete the operation of programming the first data into the memory block 150 ('N' in the step S614), the processor 134 may continue to control the memory device 150 to program the first data into the memory block 152.

In step S616, the failure processor 506 may decide whether or not the first data programmed in the memory block 152 failed based on the complete signal provided in step S614. When it is decided that the first data programmed in the memory block 152 failed ('Y' in the step S616), the failure processor 506 may transfer the failure signal to the processor 134. When it is decided that the first data was successfully programmed into the memory block 152 ('N' in the step S616), the failure processor 506 may not transfer the failure signal to the processor 134.

In step S618, the processor 134 may perform a reprogram operation onto the first data, which was not successfully programmed, based on the failure signal provided in step S616. According to one embodiment of the present invention, the processor 134 may control the memory device 150 to be reprogrammed with the first data stored in the second memory buffer 512. According to another embodiment of the present invention, the processor 134 may control the memory device 150 to provide the controller 130 with the first data stored in the second memory buffer 512 and then to be reprogrammed with the first data.

The memory system according to an embodiment of the present invention may delete the first data stored in the controller write buffer 508, right after buffering the first data into the memory block 152 while programming the first data stored in the first memory buffer 510 into the memory block 152. Therefore, when it is determined that a program operation of the first data did not fail, that is, the first data was successfully programmed in the memory block 152, the performance of a cache program operation may be improved by increasing the size of the data buffered in the controller write buffer 508 for the same period of time, compared with the prior art where the first data stored in the controller write buffer 508 is deleted.

When the first data programmed in the memory block 152 fails, the memory system, according to an embodiment of the present invention, may directly program the first data stored in the second memory buffer 512 into the memory block 154 in the memory device 150. Accordingly, when the first data programmed in the memory block 152 fails, the speed at which such failure is processed may be improved in comparison with the prior art where the first data buffered in the controller write buffer 508 is buffered in the first memory buffer 510 and then reprogrammed into the memory block 152.

FIG. 7 is a flowchart describing an operation of a memory system in accordance with an embodiment of the present invention.

When a program command, an address information, and data are applied from the host 102 to the controller 130, the controller 130 may buffer the data into the internal write buffer. The controller 130 may transfer the data buffered in the write buffer to the memory device 150, and control the memory device 150 to buffer the provided data into an internal buffer. The controller 130 may control the memory device 150 to program the data buffered in the internal buffer of the memory device 150 into a memory block based on the provided address information. As an example, steps S702 to S720 will be described in a situation where the first data is buffered in a buffer within the memory device 150.

In step S702, the controller 130 may transfer a control signal ($Signal_{ctrl}$) to the memory device 150 and control the memory device 150 to be programmed with the first data buffered in the first memory buffer 510. The memory device 150 may transfer a start signal ($Signal_{start}$) to the controller 130 at the time that the first data is programmed.

In step S704, the controller 130 may transfer the control signal to the memory device 150 based on the start signal so that the memory device 150 may buffer the first data buffered in the first memory buffer 510 into the second memory buffer 512. The memory device 150 may transfer the complete signal to the controller 130 at the time that the operation of buffering the first data into the second memory buffer 512 is completed.

In step S706, the controller 130 may be able to delete the first data buffered in the controller write buffer 508 based on the provided complete signal. According to an embodiment of the present invention, at the time that the memory device 150 completes the operation of buffering the first data into the second memory buffer 512, the controller 130 may be able to quickly acquire the memory space of the controller write buffer 508 by deleting the first data from the controller write buffer 508. Therefore, since more data may be provided from the host 102 for the same period of time, the speed of a cache program operation may be improved.

In step S708, the controller 130 may receive the second data from the host 102 and buffer the second data in the space of the controller write buffer 508 which is freed by deleting the first data.

In step S710, the controller 130 may control the memory device 150 to buffer the provided second data into first memory buffer 510 by transferring the control signal and the second data buffered in the controller write buffer 508 to the memory device 150. The memory device 150 may transfer the complete signal to the controller 130 at the time that the operation of buffering the second data into the first memory buffer 510 is completed.

In step S712, the controller may determine whether or not the program operation for the first data performed in the step S702 is completed. If not ('N' in the step S712), the controller 130 may continue to control the memory device 150 to program the first data into the memory block 152. When it is determined that the program operation for the first data is completed ('Y' in the step S712), the controller 130 may determine whether or not the program operation for the first data failed in step S714.

When the program operation for the first data is successfully performed ('N' in step S714), the controller 130 may transfer a delete signal ($Signal_{Delete}$) to the memory device 150. In step S716, the memory device 150 may delete the first data buffered in the second memory buffer 512 based on the delete signal. When it is determined that the program operation for the first data failed ('Y' in step S714), the controller 130 may transfer the failure signal to the memory device 150. The memory device 150 may perform a reprogram operation of programming the first data buffered in the second memory buffer 512 in the memory block 154 based on the failure signal. According to an embodiment of the present invention, when the re-program operation is performed, the first data to be reprogrammed in the memory device 150 is buffered in the second memory buffer 512 disposed within the memory device 150, not in the controller write buffer 508. As a result, the time required for the reprogram operation may be reduced. FIG. 8B illustrates a reprogram operation in accordance with an embodiment of the present invention.

Figure 8A:
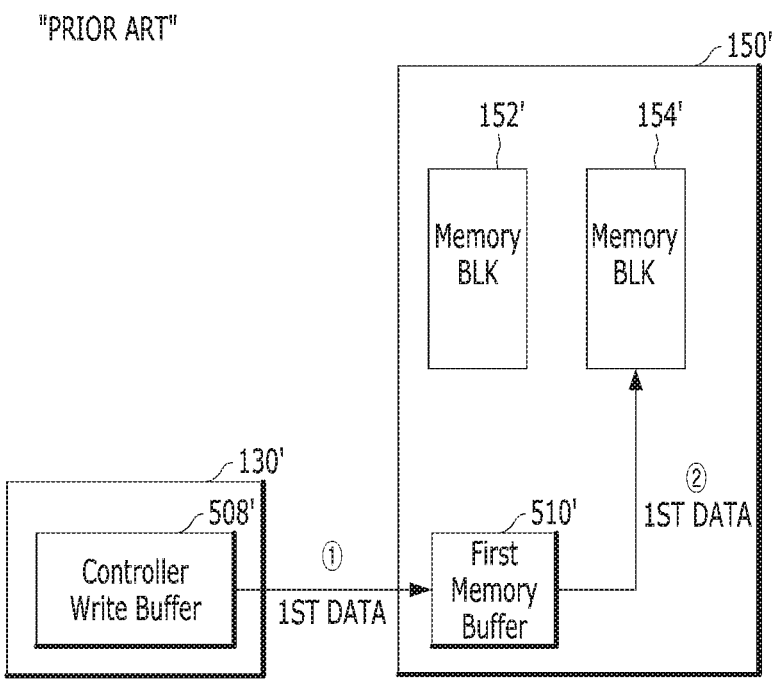
FIG. 8A illustrates a prior art reprogram operation.
Figure 8B:
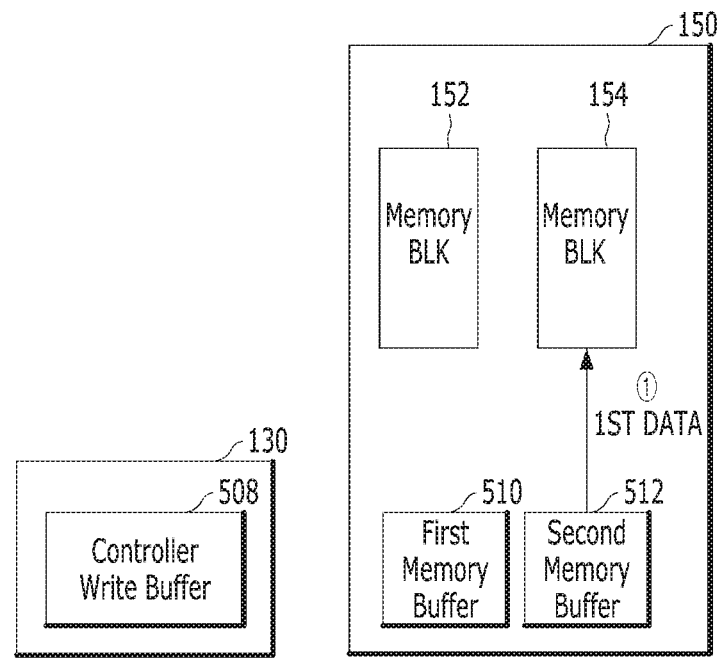
FIG. 8B illustrates a reprogram operation in accordance with an embodiment of the present invention.

FIG. 8A depicts a reprogram operation according to the prior art. According to the prior art, the first data is buffered in the controller write buffer 508' at the time that the controller 130' decides whether or not the operation of programming the first data failed, and when the first data programmed into the memory block 152' fails, the controller 130' buffers the first data buffered in the controller write buffer 508' into the first memory buffer 510' in the memory device 150'. After transferring the first data from the controller 130' to the memory device 150', the controller 130' performs the reprogram operation of programming the first data buffered in the first memory buffer 510' into the memory block 154'.

FIG. 8B may represent a reprogram operation in accordance with an embodiment of the present invention. The first data may not exist in the controller write buffer 508 but may be already buffered in the second memory buffer 512 at the time that the controller 130 decides whether or not the operation of programming the first data failed, and when the operation of programming the first data into the memory block 152 fails, the controller 130 may perform a reprogram operation of programming the first data buffered in the second memory buffer 512 into the memory block 154. Since the first data is stored in the memory device 150 at the time that it is determined that the reprogram operation is needed, it takes essentially no time to transfer the first data from the controller 130 to the memory device 150 to perform the reprogram operation. Therefore, according to an embodiment of the present invention, when the first data programmed in the memory block 152 is failed data, the controller 130 may perform a reprogram operation faster than the conventional method.

A data processing system and electronic devices to which the memory system 110 including the memory device 150 and the controller 130, which are described above in connection with FIGS. 1 to 8, are described in detail with reference to FIGS. 9 to 17.

Figure 9:
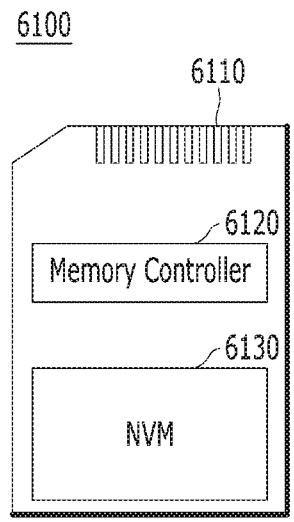
FIGS. 9 to 17 are diagrams schematically illustrating exemplary applications of the data processing system in accordance with various embodiments of the present invention.

FIG. 9 is a diagram schematically illustrating another example of the data processing system including the memory system in accordance with an embodiment. FIG. 9 schematically illustrates a memory card system to which the memory system may be applied.

Referring to FIG. 9, the memory card system 6100 may include a memory controller 6120, a memory device 6130 and a connector 6110.

More specifically, the memory controller 6120 may be electrically connected to, and configured to access, the memory device 6130 embodied by a nonvolatile memory. For example, the memory controller 6120 may be configured to control read, write, erase and background operations of the memory device 6130. The memory controller 6120 may be configured to provide an interface between the memory device 6130 and a host, and to use firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a RAM, a processor, a host interface, a memory interface and an error correction component.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system may be applied to wired/wireless electronic devices, including mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device to form a solid-state driver (SSD). Also, the memory controller 6120 and the memory device 6130 may be so integrated to form a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC), and/or a universal flash storage (UFS).

Figure 10:
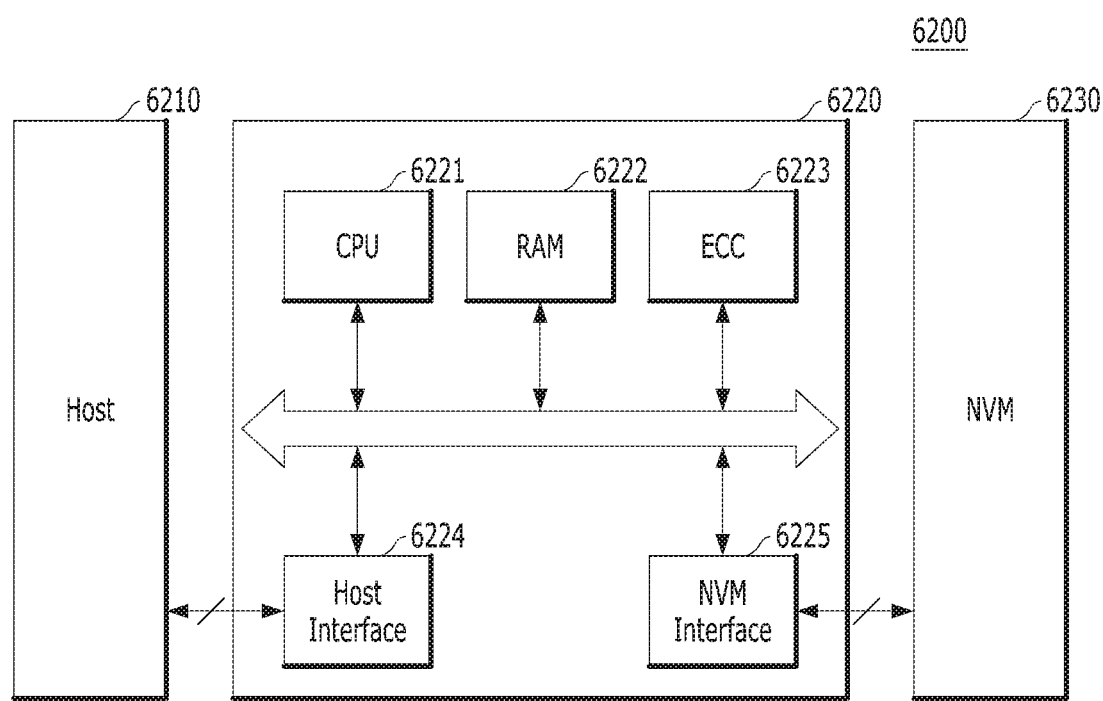

FIG. 10 is a diagram schematically illustrating another example of the data processing system including the memory system in accordance with an embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224. The memory controller 6220 may exchange data with the memory device 6230 through the NVM interface 6225. The host interface 6224 may be connected to the host 6210 through a PATA bus, a SATA bus, a SCSI, an USB, a PCIe or a NAND interface. The memory controller 6220 may have a wireless communication function with a mobile communication protocol such as WiFi or Long Term Evolution (LTE). The memory controller 6220 may be connected to an external device, for example, the host 6210 or another external device, and then exchange data with the external device. In particular, as the memory controller 6220 is configured to communicate with the external device according to one or more of various communication protocols, the memory system and the data processing system may be applied to wired/wireless electronic devices, particularly a mobile electronic device.

Figure 11:
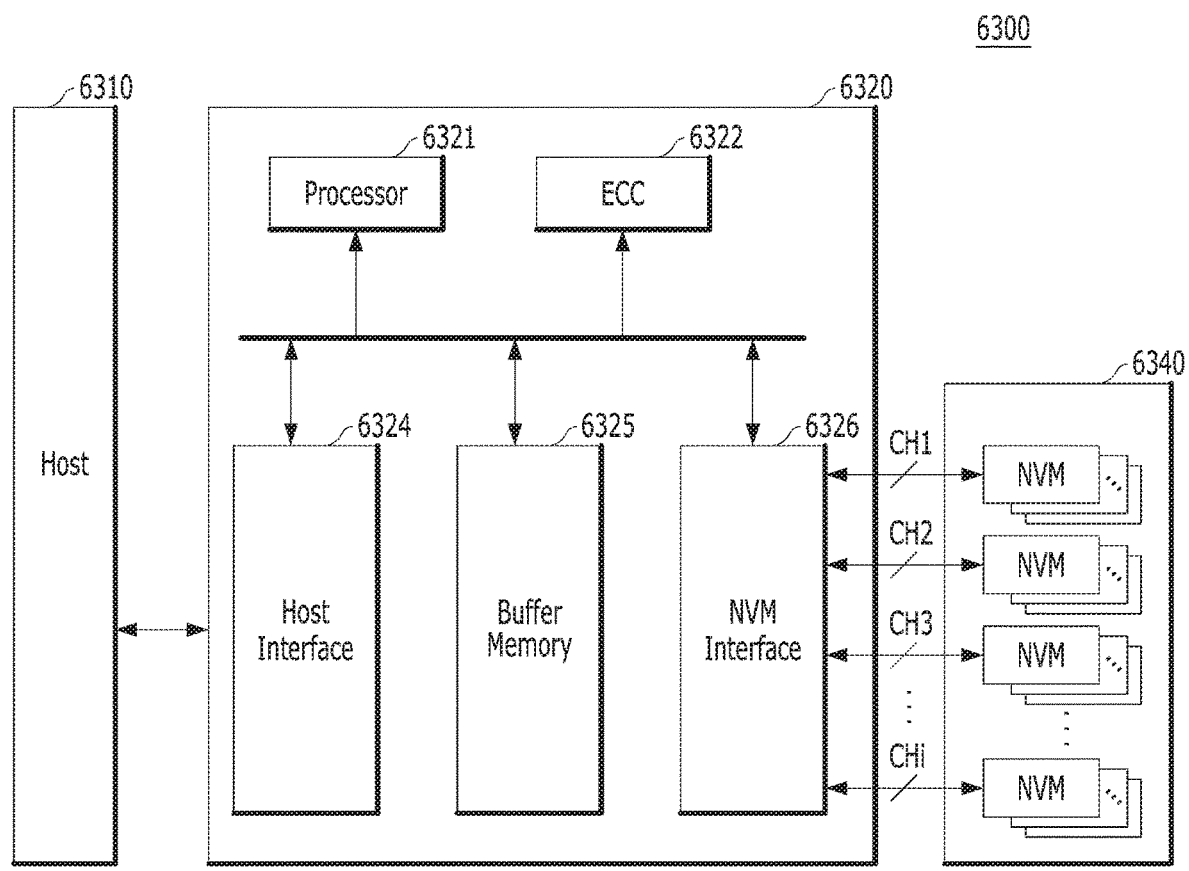

FIG. 11 is a diagram illustrating another example of the data processing system including the memory system in accordance with an embodiment. FIG. 11 schematically illustrates an SSD to which the memory system may be applied.

Referring to FIG. 11, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340. Further, the buffer memory 6325 may temporarily store meta data of the plurality of flash memories NVM, for example, map data including a mapping table. The buffer memory 6325 may be embodied by any of a variety of volatile memories such as a DRAM, a SDRAM, a DDR SDRAM, a LPDDR SDRAM and a GRAM or nonvolatile memories such as a FRAM, a ReRAM, a STT-MRAM and a PRAM. FIG. 11 illustrates that the buffer memory 6325 is embodied in the controller 6320. However, the buffer memory 6325 may be external to the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 may be applied may be provided to embody a data processing system, for example, a RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
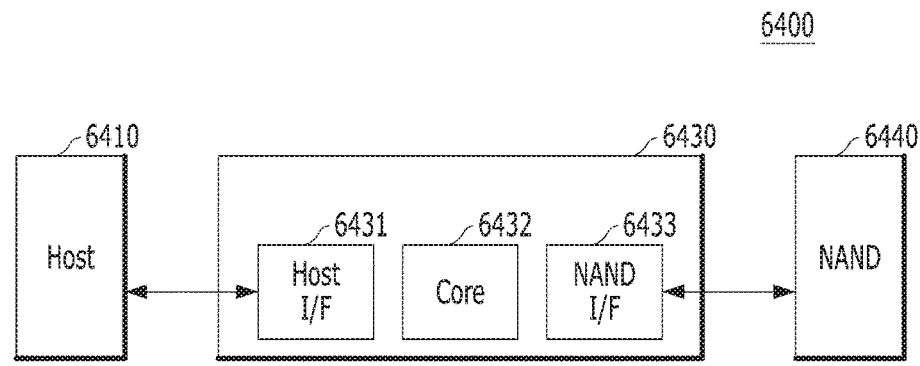

FIG. 12 is a diagram illustrating another example of the data processing system including the memory system in accordance with an embodiment. FIG. 12 schematically illustrates an embedded Multi-Media Card (eMMC) to which the memory system may be applied.

Referring to FIG. 12, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams illustrating other examples of the data processing system including the memory system in accordance with embodiments. FIGS. 13 to 16 schematically illustrate UFS (Universal Flash Storage) systems to which the memory system may be applied.

Referring to FIGS. 13 to 16, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices, particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices, particularly mobile electronic devices, through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 9 to 11, and the UFS cards 6530, 6630, 6730, 6830 may be embodied in the form of the memory card system 6100 described with reference to FIG. 9.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through any of various protocols other than the UFS protocol, for example, an UFDs, a MMC, a SD, a mini-SD, and a micro-SD.

Figure 13:
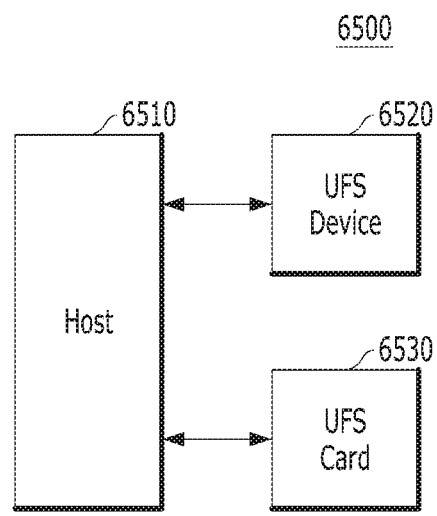

In the UFS system 6500 illustrated in FIG. 13, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, one UFS device 6520 and one UFS card 6530 are connected to the host 6510. However, a plurality of UFS devices and UFS cards may be connected in parallel or in the form of a star to the host 6410. A star formation is an arrangement in which a single device is coupled with plural devices for centralized operation. A plurality of UFS cards may be connected in parallel or in the form of a star to the UFS device 6520 or connected in series or in the form of a chain to the UFS device 6520.

Figure 14:
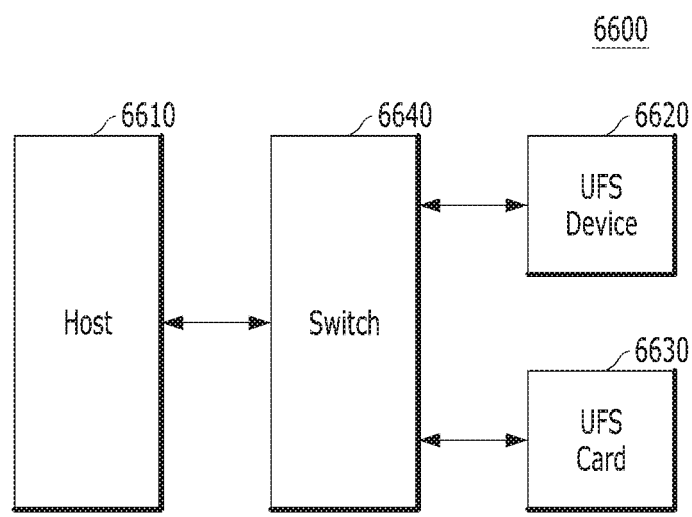

In the UFS system 6600 illustrated in FIG. 14, each of the host 6610, the UFS device 6620 and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, one UFS device 6620 and one UFS card 6630 are connected to the switching module 6640. However, a plurality of UFS devices and UFS cards may be connected in parallel or in the form of a star to the switching module 6640. A plurality of UFS cards may be connected in series or in the form of a chain to the UFS device 6620.

Figure 15:
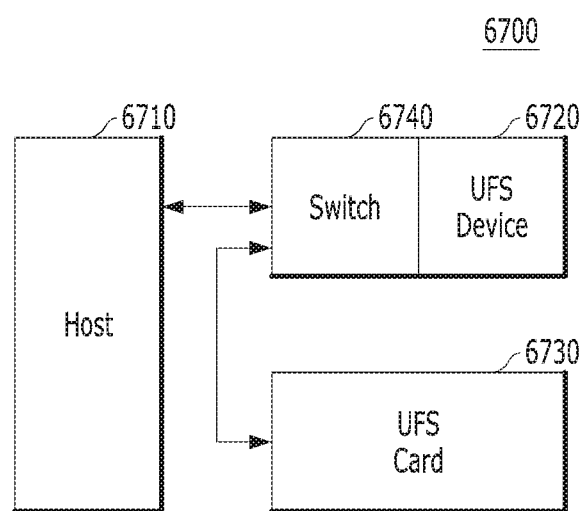

In the UFS system 6700 illustrated in FIG. 15, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro. The switching module 6740 may be integrated as one module with the UFS device 6720 inside or outside the UFS device 6720. In the illustrated embodiment, one UFS device 6720 and one UFS card 6730 are connected to the switching module 6740. However, a plurality of modules, each including the switching module 6740 and the UFS device 6720, may be connected in parallel or in the form of a star to the host 6710. In another example, a plurality of modules may be connected in series or in the form of a chain to each other. Furthermore, a plurality of UFS cards may be connected in parallel or in the form of a star to the UFS device 6720.

Figure 16:
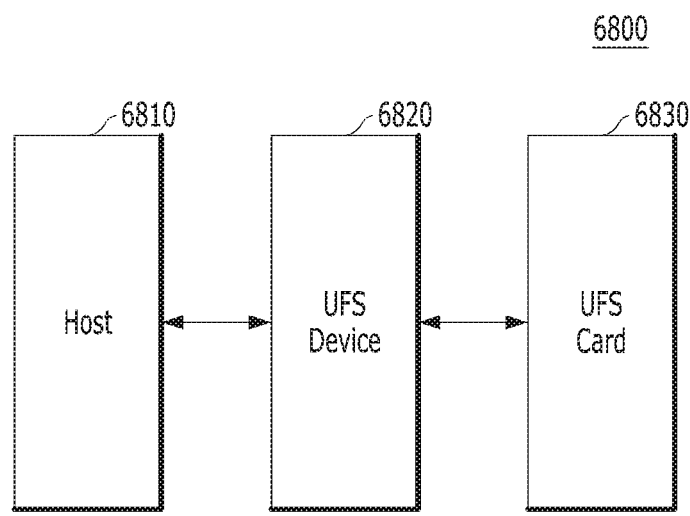

In the UFS system 6800 illustrated in FIG. 16, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the illustrated embodiment, one UFS device 6820 is connected to the host 6810 and one UFS card 6830 is connected to the UFS device 6820. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 17:
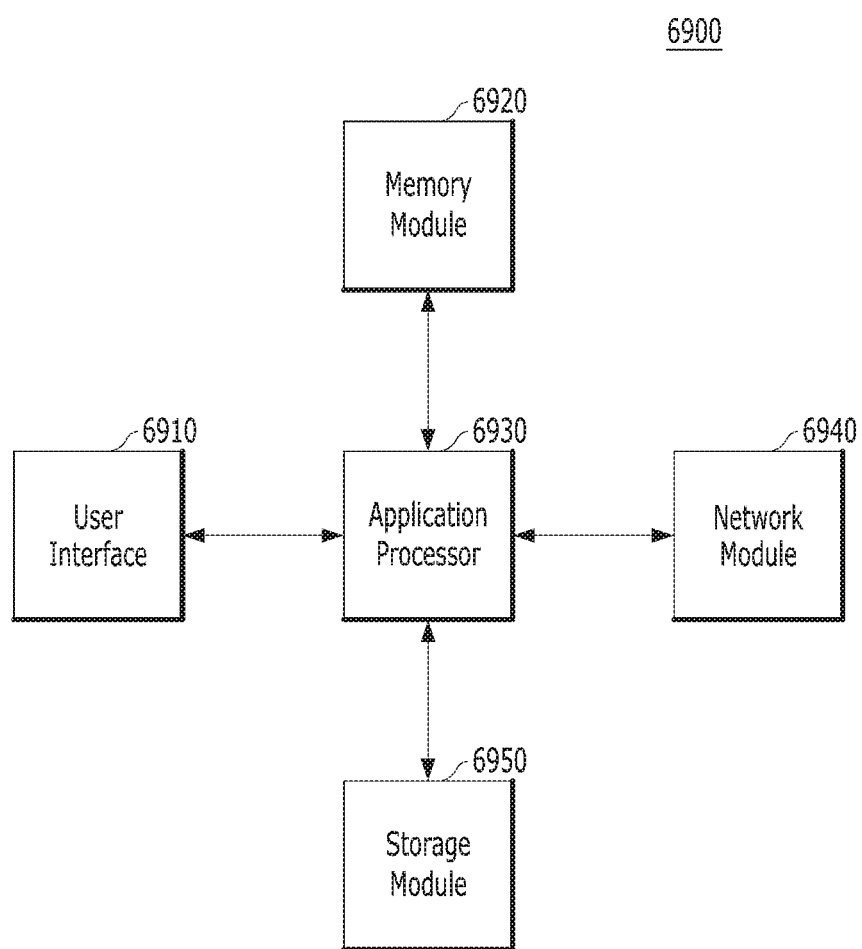

FIG. 17 is a diagram illustrating another example of the data processing system including the memory system in accordance with an embodiment of the present invention. FIG. 17 is a diagram schematically illustrating a user system to which the memory system may be applied.

Referring to FIG. 17, the user system 6900 may include an application processor 6930, a memory module 6920, a network module 6940, a storage module 6950 and a user interface 6910.

More specifically, the application processor 6930 may drive components in the user system 6900, for example, an OS, and include controllers, interfaces and a graphic engine which control the components in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as a DRAM, a SDRAM, a DDR SDRAM, a DDR2 SDRAM, a DDR3 SDRAM, a LPDDR SDARM, a LPDDR3 SDRAM or a LPDDR3 SDRAM or a nonvolatile RAM such as a PRAM, a ReRAM, a MRAM or a FRAM. For example, the application processor 6930 and the memory module 6920 may be packaged and mounted in the form of POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, an eMMC and an UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to the embodiments of the present invention, a memory system may quickly perform a cache program operation.

While the present invention has been illustrated and described with respect to the specific embodiments, it will be apparent to those skilled in the art in light of the present disclosure that various changes and modifications may be made without departing from the spirit and scope of the invention as defined in the following claims.

What is claimed is:

1. A memory system including a controller, comprising:
   a memory device including a first memory buffer, a second memory buffer and a plurality of memory blocks;
   a controller write buffer of the controller suitable for buffering first data into the first memory buffer;
   a memory buffer manager suitable for controlling the memory device to buffer the first data stored in the first memory buffer into the second memory buffer while the memory device programs, in a program operation, the first data into a first memory block of the plurality of memory blocks;
   a controller buffer manager suitable for deleting the first data stored in the controller write buffer of the controller after the memory device buffers the first data into the second memory buffer; and
   a failure processor suitable for controlling the memory device to perform a reprogram operation of reprogramming the first data stored in the second memory buffer into a second memory block of the plurality of memory blocks, other than the first memory block in which the program operation fails.

2. The memory system of claim 1, wherein the controller buffer manager deletes the first data stored in the controller write buffer and then buffers a second data into the controller write buffer.

3. The memory system of claim 2, wherein the controller buffer manager buffers the second data stored in the controller write buffer into the first memory buffer, while the memory device programs the first data into the first memory block.

4. The memory system of claim 3, wherein the memory device performs a cache program operation of programming the second data stored in the first memory buffer into a memory block of the plurality of memory blocks, when the first data is successfully programmed into the first memory block.

5. The memory system of claim 1, wherein the reprogram operation programs the first data into a memory block of the plurality of memory blocks by buffering the first data stored in the second memory buffer into the controller write buffer and then buffering the first data into the first memory buffer.

6. The memory system of claim 1, wherein the controller write buffer comprises a volatile memory.

7. The memory system of claim 1, wherein the first memory buffer comprises a non-volatile memory.

8. The memory system of claim 1, wherein the second memory buffer comprises a non-volatile memory.

9. The memory system of claim 1, wherein the failure processor deletes the first data stored in the second memory buffer, when the first data is successfully programmed.

10. A method for operating a memory system comprising a controller and a memory device including a first memory buffer, a second memory buffer and a plurality of memory blocks comprising:
   controlling the memory device to buffer first data stored in the first memory buffer into the second memory buffer while the memory device programs, in a program operation, the first data into a first memory block of the plurality of memory blocks;
   deleting the first data stored in a controller write buffer of the controller that buffers the first data in the first memory buffer, after the memory device buffers the first data into the second memory buffer; and
   controlling the memory device to perform a reprogram operation of reprogramming the first data stored in the second memory buffer into a second memory block of the plurality of memory blocks, other than the first memory block in which the program operation fails.

11. The method of claim 10, further comprising:
buffering second data into the controller write buffer after deleting the first data stored in the controller write buffer.

12. The memory system of claim 11, further comprising:
buffering second data stored in the controller write buffer into the first memory buffer, while the memory device programs the first data into the first memory block.

13. The method of claim 12, further comprising:
performing a cache program operation of programming the second data stored in the first memory buffer into a memory block of the plurality of memory blocks, when the first data is successfully programmed into the first memory block.

14. The method of claim 10, wherein the reprogram operation comprises programming the first data into a memory block of the plurality of memory blocks by buffering the first data stored in the second memory buffer into the controller write buffer and then buffering the first data into the first memory buffer.

15. The method of claim 10, wherein the controller write buffer comprises a volatile memory.

16. The method of claim 10, wherein the first memory buffer comprises a non-volatile memory.

17. The method of claim 10, wherein in the controlling of the memory device to perform the reprogram operation of reprogramming the first data, when the program operation has failed,
the first data stored in the second memory buffer is deleted, when the first data is successfully programmed.

18. A memory system, comprising:
a memory device including a first buffer, a second buffer and a plurality of memory blocks;
a controller including a controller write buffer that buffers first data into the first buffer,
wherein the controller is suitable for:
   buffering the first data to the controller write buffer,
   controlling a program operation of programming the first data into a first memory block of the plurality of memory blocks,
   buffering the first data to the second buffer while the program operation is performed,
   deleting the first data from the controller write buffer,
buffering second data to the controller write buffer before the program operation is completed,
   buffering the second data to the first buffer,
   determining whether the program operation has failed, and
   performing a reprogram operation of the first data in the second buffer into a second memory block of the plurality of memory blocks, other than the first memory block when it is determined that the program operation has failed in the first memory block, or deleting the first data stored in the second buffer when it is determined that the program operation did not fail.

* * * * *